Oct. 18, 1966

T. W. GITTUS 3,279,551

WEIGHING SCALE WITH PROJECTED INFORMATION CORRELATED
WITH CALIBRATED SELECTION KNOB

Filed July 13, 1964

INVENTOR.
THOMAS W. GITTUS

BY

Thomas H. Grafton
ATTORNEY

Oct. 18, 1966 T. W. GITTUS 3,279,551
WEIGHING SCALE WITH PROJECTED INFORMATION CORRELATED
WITH CALIBRATED SELECTION KNOB
Filed July 13, 1964 4 Sheets-Sheet 2

INVENTOR.
THOMAS W. GITTUS
BY
Thomas H. Grafton
ATTORNEY

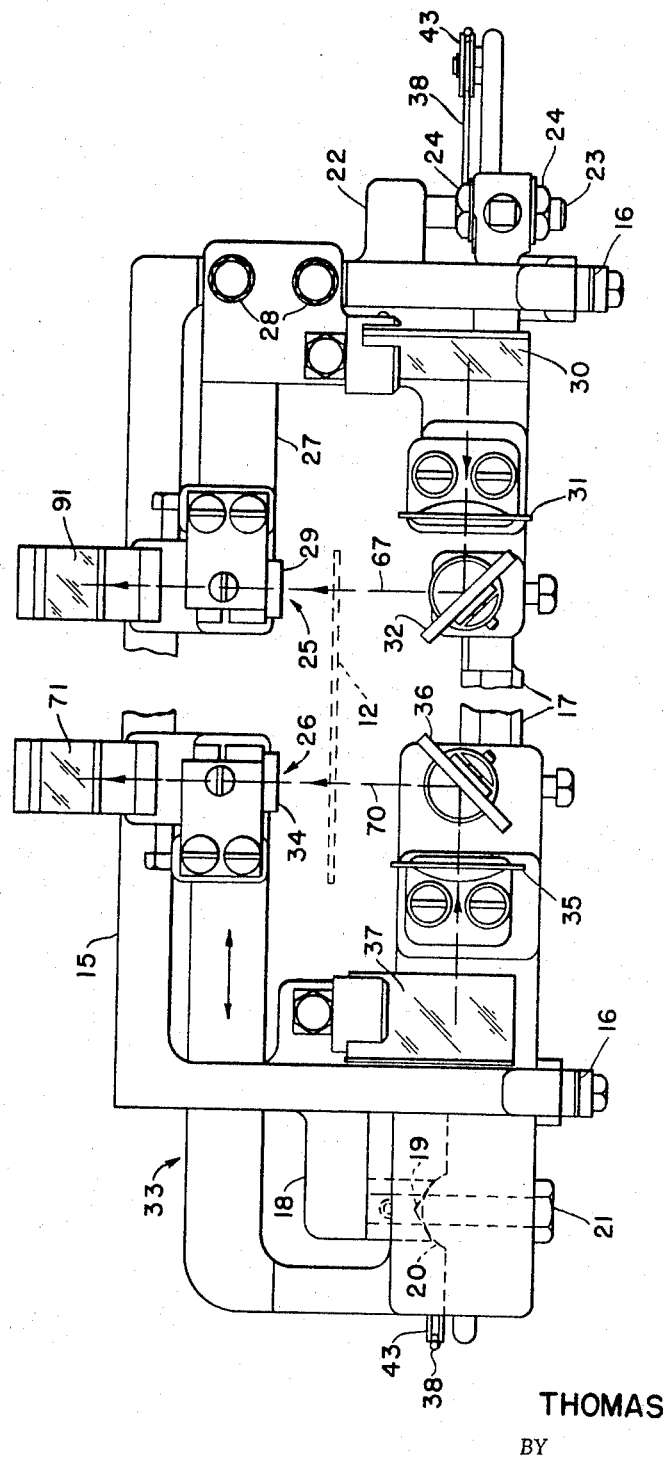

Oct. 18, 1966 T. W. GITTUS 3,279,551
WEIGHING SCALE WITH PROJECTED INFORMATION CORRELATED
WITH CALIBRATED SELECTION KNOB
Filed July 13, 1964 4 Sheets-Sheet 4
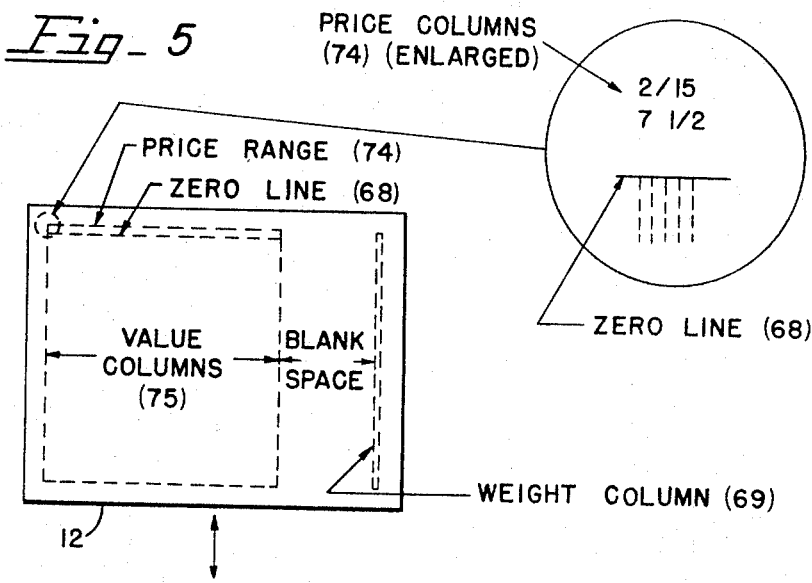
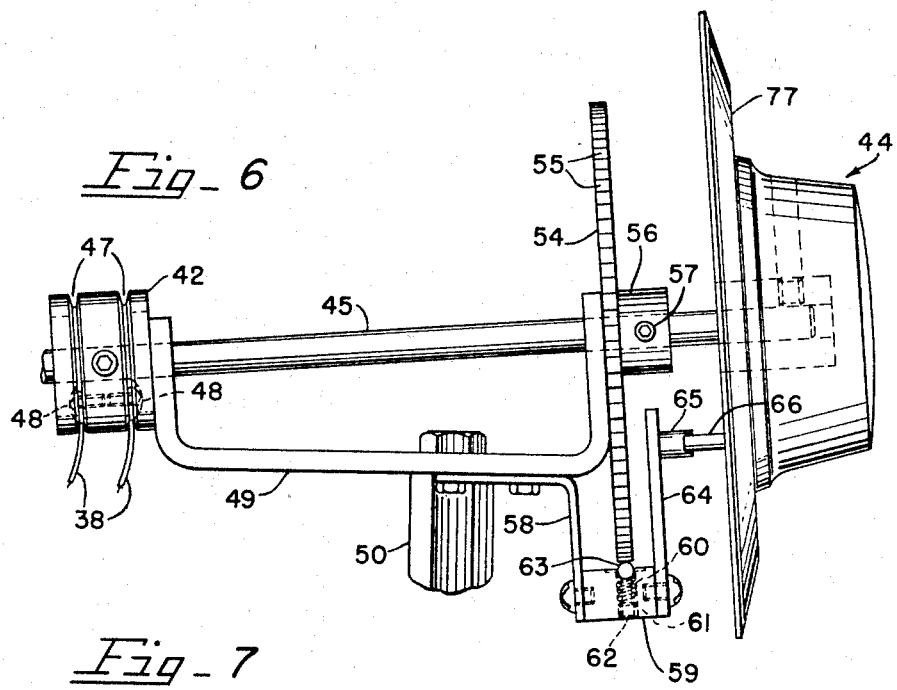
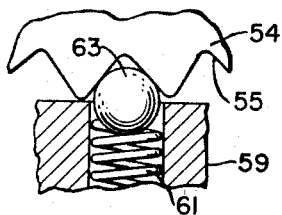
INVENTOR.
THOMAS W. GITTUS
BY
Thomas H. Grafton
ATTORNEY

United States Patent Office 3,279,551
Patented Oct. 18, 1966

3,279,551
WEIGHING SCALE WITH PROJECTED INFORMATION CORRELATED WITH CALIBRATED SELECTION KNOB
Thomas W. Gittus, Lambertville, Mich., assignor to Toledo Scale Corporation, Toledo, Ohio, a corporation of Ohio
Filed July 13, 1964, Ser. No. 382,244
8 Claims. (Cl. 177—178)

This invention relates to weighing scales and more particularly to projected indication weighing scales.

Heretofore in projected indication weighing scales of the retail computing type such as is disclosed in U.S. Patent No. 3,074,496 issued January 22, 1963 in the name of Lawrence S. Williams, the operator selected the desired unit price of the commodity to be weighed by turning a price selector knob which reciprocated a carriage carrying a projection lens along a slide rail to direct a beam projecting images of unit price and/or computed value indicia through a selected column of indicia on the scale's chart until the image of the selected unit price indicium appeared in a "Value" display window.

The above prior arrangement is generally unsatisfactory in two respects. First, the price selector knob was not calibrated, the only price indication being that displayed in the reading window. According, when a load was placed upon the scale the resulting movement of the chart caused the price image to disappear, i.e., under load, only value images were displayed in the Value display window. Hence, it was mandatory in the prior scale to select the price when the scale indicated zero load only. Calibration of the price selector knob in itself could not remedy the situation because there was not close enough correspondence between movements of the above reciprocable carriage and the price selector knob to avoid getting indications of price at the borderline between two prices. Second, there was no provision in the prior scale for setting up prices without calculation such as 2 pounds for 15 cents, or 3 pounds for 19 cents, or 4 pounds for 49 cents, or 5 pounds for 59 cents, or 6 pounds for 89 cents, or 7 pounds for 100 cents, etc. Such combinations are common today in retail food stores.

Accordingly, the objects of this invention are to improve projected indication computing weighing scales, to facilitate the setting up of unit prices in such scales, to increase the precision of such scales, to provide price selector mechanism calibration in such scales, to provide fractional price selector mechanism calibration in such scales, to provide color coded fractional price selector mechanism calibration in such scales, and to provide close correspondence between movements of the price selector mechanism in such scales and the movable parts of the optical projection systems in such scales.

One embodiment of this invention enabling the realization of these objects is a modification of the weighing scale disclosed in the above U.S. Patent No. 3,074,496. The chart in such scale has been changed to include prices such as 2 pounds for 15 cents, 7 pounds for 100 cents, etc., and the price selector knob in such scale has been calibrated to correspond to the chart. Fractional prices in the "2-for" category appear on the knob in one color code area, in the "3-for" category in another color code area, etc. A detent has been added to produce close correspondence between movements of the price selector knob and the carriage which carries the movable parts of the optical projection system to avoid getting indications of price in the display window at the borderline between two prices.

In operation, the superior simplicity of which is the principal feature of the invention, the operator can select the desired unit price of the commodity to be weighed when the scale is at zero load indication by turning the price selector knob until the image of the selected unit price indicium appears in the Value display window or until the calibrated knob indicates the desired unit price. The operator also can select the desired unit price of the commodity to be weighed when the scale is not at zero indication (tare weight such as box or wrapper to be filled upon scale) by turning the calibrated knob until it indicates the desired unit price. Should the operator wish to select a total price of a single commodity without calculation for a plurality of pounds each having a fractional price per pound, e.g., 4 pounds for 49 cents, he simply turns the price selector knob to 4 for 49 cents indication, all of the 4-for prices being segregated in a particular color zone for quick visual identification. He also sees the price 4/49 and 12¼ displayed in the Value window when no load is upon the scale.

The above and other objects and features of this invention will be appreciated more fully from the following detailed description when read with reference to the accompanying drawings wherein.

Figure 3:
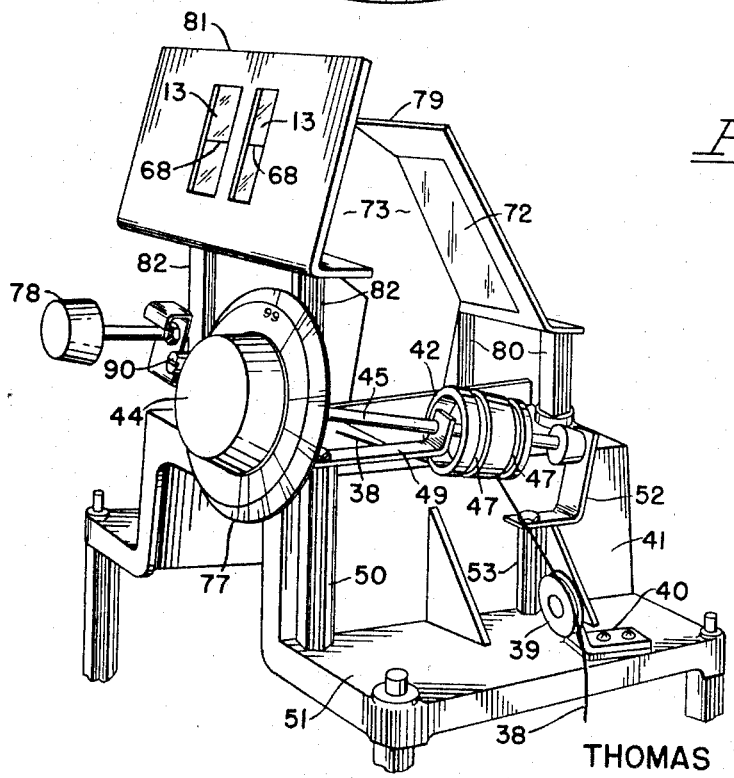
FIG. 3 is a perspective view of the upper part of the weighing scale with its housing removed to reveal inner details.

FIG. 4 is a plan view corresponding to FIG. XII in the above U.S. Patent No. 3,074,496 of a part of the lower part of the weighing scale with its housing removed to reveal inner details;

FIG. 5 is a schematic diagram of the chart which is illustrated in FIG. 4;

FIG. 6 is an enlarged, fragmentary elevational view of a portion of the weighing scale as shown in FIG. 3; and FIG. 7 is an enlarged, fragmentary sectional view of the lower portion of the device shown in FIG. 6.

Figure 1:
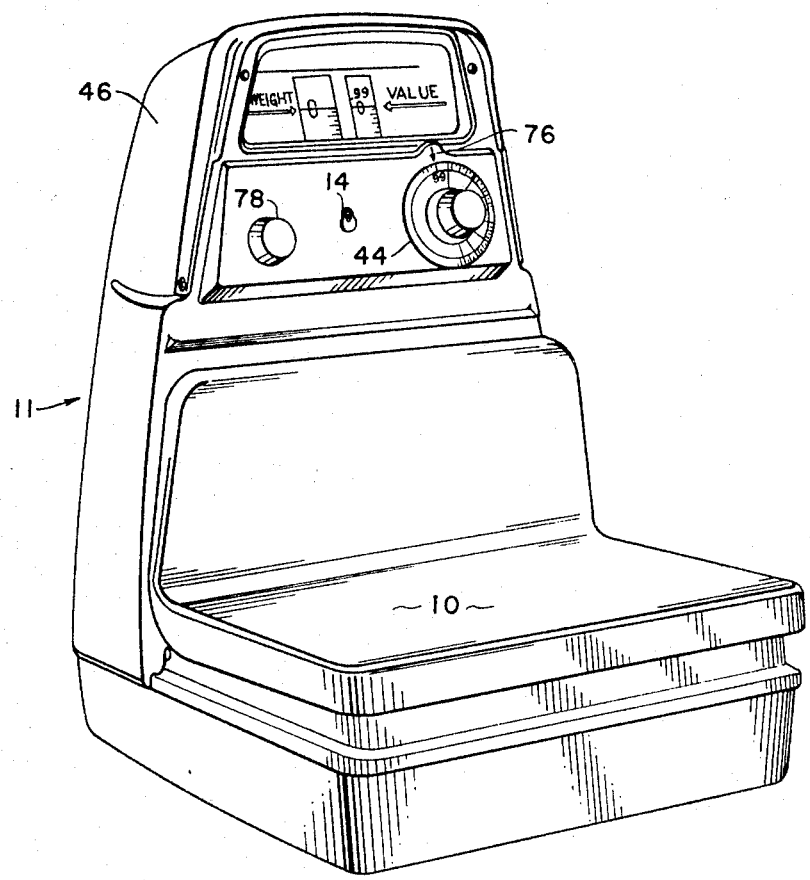
FIG. 1 is a perspective view of one form of projected indication computing weighing scale according to this invention.

Referring to the drawings, in FIG. 1, the force of gravity acting on a load placed upon a load receiver or platter 10 is transmitted to a lever as shown in the above U.S. Patent No. 3,074,496 of a projected indication weighing scale 11, such lever carrying a chart 12 (FIGS. 4 and 5) which accordingly is condition or load responsive.

The chart 12, which carries apropriate indicia with respect to weight, unit price and computed value of the material to be weighed on the scale, is movable with the lever and greatly enlarged images of the chart indicia are projected by means of the optical system disclosed in the above U.S. Patent No. 3,074,496 onto a display screen 13 (FIG. 3). The chart 12 is moved to effect a zero adjustment by turning a screw 90 (FIG. 3) which is behind a pivotable cover 14 that occupies the same space on the scale as that occupied by the tare knob shown in the above U.S. Patent No. 3,074,496 (tare knob 88 in the patent), the screw adjustment for zero setting being described in such patent.

The scale is provided with an optical system which produces projected images of the weight, unit prices and computed value indicia on the display screen 13. The system includes an optical frame 15 which is pivotally mounted like a cradle by means including three flexure ribbons 16, two of which are shown in FIG. 4. A slide rail 17 is carried by the optical frame 15 closely adjacent and parallel to the chart 12. The left-hand end of the slide rail 17 as viewed in FIG. 4 is pivotally attached to an ear 18 of the optical frame which has a V-notched bearing surface 19 that cooperates with a cylindrical surface 20 of the slide rail. A screw 21 holds the surfaces 19 and 20 together. The right-hand end of the slide rail 17 is adjustably attached to an ear 22 of the optical frame by a stud 23 that is threaded into the ear 22 and extends through an oversize opening in the slide rail in a sloppy fit. Lock nuts 24 threaded on the stud 23 against each side of the slide rail 17 are provided to hold the slide rail in a position on the stud which is adjustable along the axis of the stud.

The optical system is divided into a weight projection subassembly 25 stationarily mounted on the right-hand end of the optical frame 15 as viewed in FIG. 4 and a unit price and computed value projection subassembly 26 shiftably mounted on the left-hand end of the slide rail 17. The weight projection subassembly 25 includes a generally U-shaped bracket 27 fixedly attached by screws 28 to the optical frame 15 adjacent the ear 22 on the frame, the legs of the U straddling an end of the chart 12, on which bracket 27 a projection lens 29 is mounted at one side of the chart 12 and a first mirror 30, a condensing lens 31 and a second mirror 32 are mounted at the other side of the chart.

The unit price and computed value projection subassembly 26 includes a generally U-shaped reciprocable carriage 33 slidable on the slide rail 17, the legs of the U straddling an end of the chart 12. A projection lens 34 is mounted on the carriage 33 at one side of the chart 12 and a condensing lens 35 and a mirror 36 are mounted on the carriage at the other side of the chart. A stationary mirror 37 is mounted on the optical frame 15 adjacent the ear 18 on the frame.

The carriage 33 is selectively shiftable on the slide rail 17 in a path parallel to the chart 12 as indicated by the double-ended arrow in FIG. 4 by means of a cord drive. The cord drive includes a cord 38 which runs over a pair of idlers 39, one of which is shown in FIG. 3, mounted on brackets 40 attached to the frame 41 of the weighing scale, around a spool 42 to which the ends of the cord are attached forming an endless cord, over an idler (not shown), and over a pair of pulleys 43 mounted one on each end of the slide rail 17. The cord 38 is fixedly clamped to the carriage 33 as shown in the above U.S. Patent No. 3,074,-496. The carriage 33 may be shifted back or forth on the slide rail 17 by turning a price selector knob 44 fixedly attached to the end of a shaft 45 exteriorly of the scale housing 46 which turns the spool 42 and drives the cord 38 in the selected direction. The spool 42 has two grooves 47 one of which receives one end of the cord 38 and the other of which receives the other end of the cord 38, such cord ends extending through radially extending holes in the spools to be caught under the heads of screws 48 (FIG. 6) to secure the cord ends to the spool.

The shaft 45 is rotatably mounted in a U-shaped bracket 49 atop a post 50 erected from a shelf 51 of the frame 41 and has an end which extends beyond such bracket 49 to be rotatably mounted in a bracket 52 atop a post 53 also erected from the shelf 51. The price selector knob 44 is fixedly attached to the end of the shaft 45 exteriorly of the scale housing 46 and a detent disc 54 having a peripheral notch 55 for each price selecting position of the knob also is fixed to the shaft 45, the disc 54 being attached to the shaft 45 through its hub 56 and a set screw 57. A bracket 58 is carried by the U-shaped bracket 49 and it carries in turn a block 59 defining a tapped hole 60 which receives a coil spring 61 that is held from falling out of the hole 60 by a set screw 62 and that is compressed between the set screw 62 and a ball bearing 63. The ball bearing 63 is retained in the upper part of the hole 60 by the detent disc 54. A plate 64 is carried by the block 59 and it carries a stop pin 65 that obstructs movements of the knob 44 at either end of its path of travel by engaging a stop pin 66 carried by the knob 44. Accordingly, as the detent disc 54 is rotated, the ball bearing is urged into the successive disc notches 55 to detent the price knob 44 and at the same time to detent the carriage 33 which carries the projection lens 34 (FIG. 4). The detent assures exact correspondence between movements of the price selector knob 44 and the reciprocable carriage 33 to avoid getting indications of price at the borderline between prices, i.e., when the calibrated knob 44 is turned to a selected price that particular price is displayed in a centered position on the screen 13.

A light beam 67 projecting images of weight indicia emanating from a suitable source is turned horizontally and parallel to the chart 12 by the mirror 30. The beam 67 then passes through the condensing lens 31 to the mirror 32 which turns it through 90° and causes the beam to travel in the proper direction to pass through a weight column 69 (FIG. 5) of the chart 12 and through the projection lens 29 to a mirror 91. The beam then travels to a mirror (not shown) which reflects it to the display screen 13 having a frosted front surface with an index or zero line 68 thereon.

A second light beam 70 projecting images of unit price and/or computed value indicia emanates from the same light source and is turned by the mirror 37 horizontally and parallel to the chart 12. The beam 70 then passes through the condensing lens 35 to the mirror 36 which turns it through 90° and causes the beam to travel in the proper direction to pass through price range 74 and/or value 75 columns (FIG. 5) of the chart 12 and through the projection lens 34 to a mirror 71 attached to the carriage 33. The mirror 71 turns the beam upwardly so that it travels to a mirror 72 (FIG. 3) which reflects the beam onto the display screen 13. A vertical baffle 73 (FIG. 3) prevents possible interference between the several light beams. The mirror 72 is mounted in a frame 79 atop two posts 80 erected from the frame 41 and the display screen 13 is mounted in a frame 81 atop two posts 82 erected from the frame 41.

The weight, unit price and computed value columns of the chart 12 are shown schematically in FIG. 5 and are shown as they actually appear in their projected form in Weight and Value windows which are located in front of the display screen in FIG. 1. In operation, the image of the particular unit price displayed along with the image of its computed value column depends on the position of the selectively shiftable carriage 33 which carries the projection lens 34 along the slide rail 17. As shown in FIG. 1, the unit price 99 appears in the Value window representing a price of 99 cents per pound of a commodity to be weighed. The operator can select the desired unit price when the scale is at zero by turning the price selector knob 44 which reciprocates the carriage 33 along the slide rail 17 into detented positions in exact correspondence to the corresponding positions of the knob as descibed above to direct the beam projecting images of unit price and/or computed value indicia through a selected column of indicia until the image of the selected unit price indicium appears in the Value window. The operator also can select the desired unit price when the scale is at any load position by turning the calibrated knob 44 until a stationary pointer 76 (FIG. 1) points to the desired unit price indicium on the knob 44. Should the operator wish to select a total price of a single commodity without calculation for a plurality of pounds each having a fractional price per pound, e.g., 4 pounds for 49 cents, he simply turns the price selector knob 44 to 4-for-49 (FIG. 2), all of the 4-for prices being segregated in a particular color zone for quick identification. He also sees 4/49 and 12¼ displayed in the Value window when no load is upon the scale.

Figure 2:
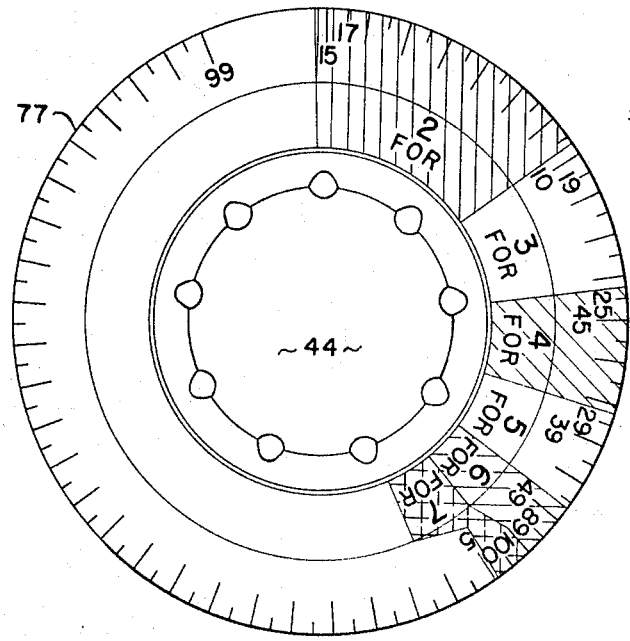
FIG. 2 is an enlarged plan view of the price selector knob shown in FIG. 1.

The price selector knob 44 is shown in detail in FIG. 2. The knob 44 has a skirt 77 bearing colored sectors to distinguish the 2-for prices from the 3-for prices, from the 4-for prices, etc. The total prices for pluralities of pounds each having a fractional price per pound start at 2-for (pink sector) and extend through 3-for (white sector), 4-for (light green sector), 5-for (white sector), 6-for (dark blue sector), and 7-for (yellow sector). Most of the remainder of the skirt 77 bears whole number prices extending from 5 through 99 in a white sector. The prices in the price range 74 (FIG. 5) on the chart 12 corresponding to the prices on the knob 44, e.g. when the knob 44 indicates five cents the projection lens 34 sees the five cents price on the chart 12.

After selecting the price by turning the knob 44 as described above, the commodity to be weighed is placed upon the platter 10 (FIG. 1) and the chart 12 moves downward until the weight of the commodity is indicated in the Weight window and the value of such commodity computed according to the selected price is indicated in the Value window. Such downward movement of the chart 12 moves the price range 74 on the chart out of the field of view of the projection lens 34 so that prices are no longer displayed on the screen 13. However, the selected price always is indicated by the calibrated knob 44. Adjacent the knob 44 is located a switch knob 78 for turning the light source for the optical systems on and off.

The principal feature of the invention resides in the ease with which the operator can select prices such as 4 pounds-for-49 cents. He merely picks out the color coded sector on the knob 44 containing the price grouping that he wants (FIG. 2) such as the 4-for category, and turns the knob 44 until it indicates the desired price. The setting can be accomplished when the scale is at zero or when the scale is loaded. The detent ensures that the projection lens 34 sees a centered price figure on the chart 12 that corresponds to the selected price.

It is to be understood that the above description is illustrative of this invention and that various modifications thereof can be utilized without departing from its spirit and scope.

Having described the invention, I claim:

1. A projected indication weighing scale comprising, in combination, a display screen, means for projecting value images onto the screen including a load-responsive, indicia-bearing chart, a carriage movable along the chart and a projection lens carried by the carriage, the values being computed in accordance with the weights of commodities upon the scale and selected unit prices, calibrated knob means for selecting said unit prices by shifting said carriage, and detent means for detenting both the knob means and the carriage to assure correspondence between the setting of the knob means and the carriage, the detent means including a detent member provided with a peripheral notch one for each possible price setting of the knob means and a resiliently biased ball member engageable with said notches, one of the members being rotatable as one with the knob means.

2. A projected indication weighing scale according to claim 1 wherein the knob means is calibrated to indicate prices at least some of which are for prices which include two pounds for a whole number total price of a commodity having a fractional price per unit of weight.

3. A projected indication weighing scale according to claim 1 wherein the knob means is calibrated to indicate prices at least some of which are selected from a group of prices which include two pounds for a whole number total price, three pounds for a whole number total price, four pounds for a whole number total price, five pounds for a whole number total price, six pounds for a whole number total price, and seven pounds for a whole number total price.

4. A projected indication weighing scale according to claim 1 wherein the calibrated knob means carries price markings grouped in color coded areas according to numbers of weights used in calculating whole number total prices of commodities having fractional prices per unit of weight.

5. A projected indication weighing scale comprising, in combination, a display screen, means for projecting value images onto the screen including a load-responsive, indicia-bearing chart, a carriage movable along the chart and a projection lens carried by the carriage, the values being computed in accordance with the weights of commodities upon the scale and selected unit prices, calibrated knob means for selecting said unit prices by shifting said carriage, and detent means for detenting both the knob means and the carriage to assure correspondence between the setting of the knob means and the carriage, the detent means including a disc rotatable as one with the knob means and provided with a peripheral notch one for each possible price setting of the knob means, and a resiliently biased ball engageable with said notches.

6. A projected indication weighing scale according to claim 5 wherein the knob means is calibrated to indicate prices at least some of which are for prices which include two pounds for a whole number total price of a commodity having a fractional price per unit of weight.

7. A projected indication weighing scale according to claim 5 wherein the knob means is calibrated to indicate prices at least some of which are selected from a group of prices which include two pounds for a whole number total price, three pounds for a whole number total price, four pounds for a whole number total price, five pounds for a whole number total price, six pounds for a whole number total price, and seven pounds for a whole number total price.

8. A projected indication weighing scale according to claim 5 wherein the calibrated knob means carries price markings grouped in color coded areas according to numbers of weights used in calculating whole number total prices of commodities having fractional prices per unit of weight.

References Cited by the Examiner

UNITED STATES PATENTS

| | | | |
|---|---|---|---|
| 715,460 | 12/1902 | Daly | 235—85 X |
| 870,568 | 11/1907 | Ludlow | 235—87 |
| 1,494,143 | 5/1924 | White | 235—85 X |
| 1,848,769 | 3/1932 | Craig | 177—178 |
| 1,993,592 | 3/1935 | Carroll | 177—178 |
| 2,723,113 | 11/1955 | Meeker et al. | 177—178 X |
| 3,074,496 | 1/1963 | Williams | 177—178 |

FOREIGN PATENTS

| | | |
|---|---|---|
| 1,331,777 | 5/1963 | France. |
| 270,103 | 5/1927 | Great Britain. |
| 481,482 | 3/1938 | Great Britain. |
| 267,992 | 7/1950 | Switzerland. |

RICHARD B. WILKINSON, *Primary Examiner.*

LEO SMILOW, *Examiner.*

ROBERT S. WARD, *Assistant Examiner.*